(12) United States Patent
Dietrich et al.

(10) Patent No.: US 11,067,140 B2
(45) Date of Patent: Jul. 20, 2021

(54) METHOD FOR OPERATING AN ACTUATOR ARRANGEMENT FOR A CLUTCH OPERATING SYSTEM, AND ACTUATOR ARRANGEMENT

(71) Applicant: Schaeffler Technologies AG & Co. KG, Herzogenaurach (DE)

(72) Inventors: Markus Dietrich, Oberkirch (DE); Viktor Franz, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 16/498,519

(22) PCT Filed: Mar. 21, 2018

(86) PCT No.: PCT/DE2018/100243
§ 371 (c)(1),
(2) Date: Sep. 27, 2019

(87) PCT Pub. No.: WO2018/202231
PCT Pub. Date: Nov. 8, 2018

(65) Prior Publication Data
US 2020/0102990 A1  Apr. 2, 2020

(30) Foreign Application Priority Data

May 3, 2017 (DE) .......................... 102017109420.2

(51) Int. Cl.
*F16D 48/06* (2006.01)
*F16D 28/00* (2006.01)
(Continued)

(52) U.S. Cl.
CPC .......... *F16D 48/066* (2013.01); *F16D 28/00* (2013.01); *F16D 29/005* (2013.01);
(Continued)

(58) Field of Classification Search
CPC ...... F16D 48/064; F16D 48/066; F16D 28/00; F16D 29/005; F16D 2300/18;
(Continued)

(56) References Cited

U.S. PATENT DOCUMENTS

2006/0199697 A1\* 9/2006 Kirkwood .............. B60K 23/04
477/5
2016/0290412 A1\* 10/2016 Quehenberger ...... F16D 27/102
2017/0358970 A1\* 12/2017 Kim ....................... G01D 5/145

FOREIGN PATENT DOCUMENTS

DE   102004001268 A1   7/2004
DE   102010040426 A1   4/2011
(Continued)

*Primary Examiner* — Edwin A Young
(74) *Attorney, Agent, or Firm* — Kevin L. Parks

(57) ABSTRACT

A method for operating an actuator arrangement for a clutch operating system includes providing an actuator arrangement with a transmission, a piston, and an inductive sensor device. The transmission has an electric motor and a metal lead screw that converts a rotary motion into a linear motion. The piston is connected to the metal lead screw. The method also includes energizing the electric motor to linearly displace the metal lead screw in an axial direction, axially displacing the piston with the metal lead screw, using the metal lead screw as a target for the inductive sensor device, and using the inductive sensor device to determine an axial distance traveled by the piston.

10 Claims, 3 Drawing Sheets

(51) Int. Cl.
*F16D 29/00* (2006.01)
*F16H 25/22* (2006.01)

(52) U.S. Cl.
CPC .............. *F16D 2300/18* (2013.01); *F16D 2500/10412* (2013.01); *F16D 2500/3026* (2013.01); *F16D 2500/7041* (2013.01); *F16H 25/2252* (2013.01)

(58) Field of Classification Search
CPC ..... F16D 2500/1021; F16D 2500/1022; F16D 2500/1023
See application file for complete search history.

(56) References Cited

FOREIGN PATENT DOCUMENTS

| | | |
|---|---|---|
| DE | 102011003851 A1 | 8/2012 |
| DE | 102012218255 A1 | 5/2013 |
| FR | 2842267 A1 | 1/2004 |
| WO | 2009124684 A1 | 10/2009 |

\* cited by examiner

METHOD FOR OPERATING AN ACTUATOR ARRANGEMENT FOR A CLUTCH OPERATING SYSTEM, AND ACTUATOR ARRANGEMENT

CROSS-REFERENCE TO RELATED APPLICATIONS

This application is the United States National Phase of PCT Appln. No. PCT/DE2018/100243 filed Mar. 21, 2018, which claims priority to German Application No. DE102017109420.2 filed May 4, 2017, the entire disclosures of which are incorporated by reference herein.

TECHNICAL FIELD

The disclosure relates to a method for operating an actuator arrangement for a clutch operating system that includes an electric-motor-operated transmission having a lead screw that converts a rotary motion into a linear motion of a piston in the axial direction. An axial distance traveled by the piston is determined by means of a sensor device. The disclosure also relates to an actuator arrangement for carrying out the method.

BACKGROUND

DE 10 2012 218 255 A1 discloses a method for controlling a clutch, wherein the clutch is controlled by means of a hydrostatic actuator. As can be seen from FIG. 3, the hydrostatic actuator comprises a lead screw 6, which is rotated in order to move a piston 5 of a master cylinder in an axial direction. The absolute travel of the piston 5 or of the lead screw 6 in the axial direction is determined by a displacement sensor. A magnet 11, which interacts with an external displacement sensor 12 secured externally on the actuator, is mounted on the piston 5 in order to determine the absolute travel. This combination of a magnet 11 and an external displacement sensor 12 takes up a large amount of installation space and increases the costs of producing the actuator arrangement.

SUMMARY

According to the disclosure, an inductive sensor device is operatively connected to the metal lead screw that is connected to the piston, and the metal lead screw is used as a sensor target for determining the axial distance. This has the advantage that, with the lead screw, a component element which is as such situated in the actuator arrangement is used, and therefore it is possible to dispense with a separate sensor target, reducing the installation space for the actuator arrangement. To perform the inductive measuring function, it is sufficient for the lead screw to be manufactured from a metallic material, thus enabling the axial position of the lead screw and thus that of the piston to be determined in conjunction with an inductive sensor device.

A coil, which with an evaluation circuit forms the sensor device, may be introduced into the path of movement of the lead screw. Here, the sensitivity of inductance measurement is determined by the extent of the coil since the entry path of the lead screw into the coil is proportional to coil damping.

In one embodiment, an excitation frequency of the coil is tuned with respect to a surrounding zone of influence thereof within the actuator arrangement. By means of this adaptation of the excitation frequency, a static metal tube in the interior of the coil can be blanked out electronically, for example. Thus, the measurement results provided in relation to the axial travel of the piston in the actuator arrangement are more reliable.

In one embodiment, the coil is linearized. A proportional relationship between the measured inductance and the distance traveled by the lead screw is thereby established, simplifying determination of the distance.

In order to compensate for nonlinearities which arise at the end of the coil owing to static metal components in the immediate zone of influence of the coil, the coil is linearized at the end of the line.

In one variant, the distance obtained from the inductance measurement is checked for plausibility by measurement of the rotation of the lead screw with a rotational position sensor. A safety function is thereby implemented in the actuator arrangement. Through the use of two different physical principles of measurement and separate targets, the inductance evaluation can be continuously checked for correctness by the measurement results from the rotor position sensor.

The disclosure also relates to an actuator arrangement for a clutch operating system, including a transmission having a lead screw that converts a rotary motion of the transmission into a linear motion of a piston connected to the lead screw, and a sensor device for determining the travel of the piston. In an actuator arrangement in which the installation space is reduced, a coil surrounds the metal lead screw, which is used as a sensor target. The coil is connected to an evaluation circuit for determining the screw position from a change in the inductance of the coil. Here, the lead screw is used directly as a sensor target since it is made of metal and thus damps the coil. The use of the lead screw as a sensor target furthermore has the advantage that tilting of the lead screw does not lead to a measurement error, and this also allows direct determination of the fluid displaced in the clutch operating system by the piston through inductance measurement with the coil.

In one embodiment, an evaluation circuit for determining the travel of the piston in accordance with the change in the inductance of the coil is connected to the coil and arranged within the actuator arrangement. Since these evaluation circuits are small, they can be arranged directly on a carrier board which also carries other electronic components of the actuator. An arrangement of an external sensor device can thus be eliminated, likewise contributing to the reduction of the installation space of the actuator arrangement.

A metal shield may be arranged around the coil. This makes the actuator arrangement more robust with respect to external dynamic influences since the metal shield is static and dominant with respect to the influences, thereby making it possible to eliminate these influences from the measurement result by calibration.

In one embodiment, the extent of the coil, which is arranged on a coil carrier, predetermines an entry zone for the metal lead screw. The extent of the coil thus makes possible matching with a maximum axial distance that can be traveled by the piston and the entry path of the screw into the coil is proportional to the coil damping.

To check the accuracy of the axial travel of the piston determined by the inductance measurement, a rotor position sensor for detecting the rotation of the lead screw is arranged opposite one end of the lead screw. By means of this rotation, it is likewise possible to deduce the distance traveled by the lead screw, which is calibrated with the distance determined by the inductance measurement.

BRIEF DESCRIPTION OF THE DRAWINGS

The disclosure allows numerous embodiments. One of these will be explained in greater detail by means of the figures of the drawings. In the drawings.

DETAILED DESCRIPTION

Figure 1:
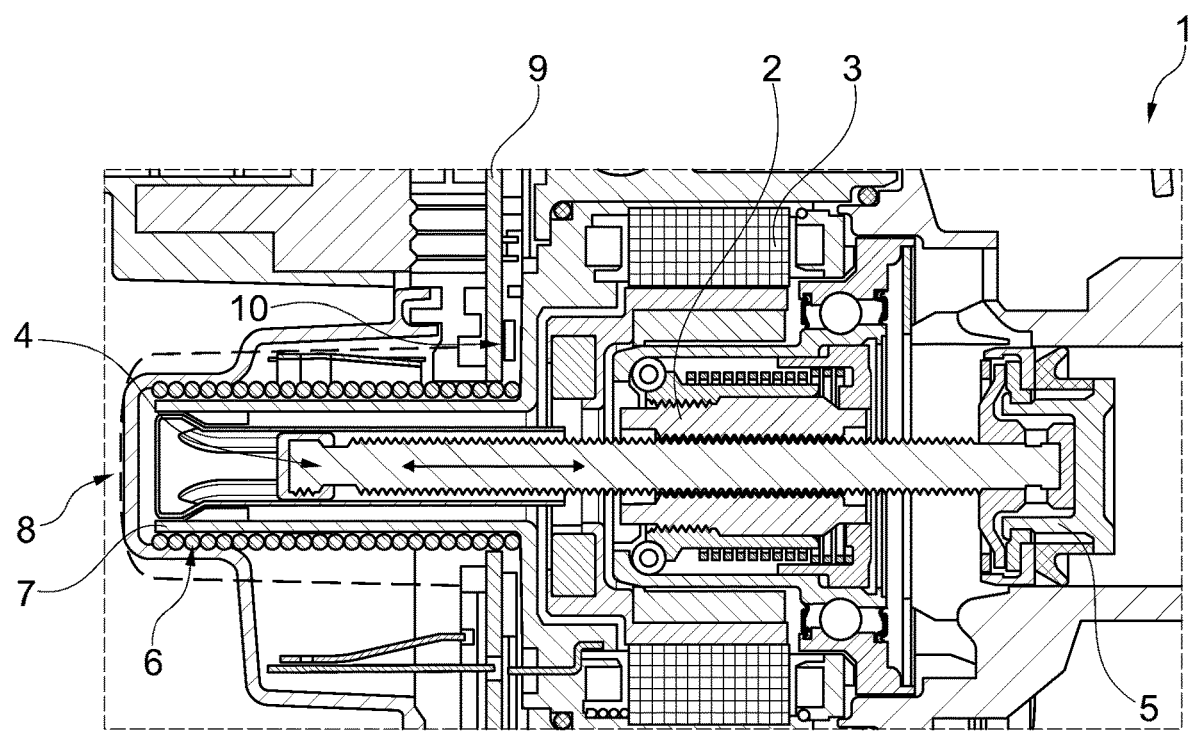
FIG. 1 shows an illustrative embodiment of the actuator arrangement according to the disclosure.

FIG. 1 illustrates an example embodiment of actuator arrangement 1 according to the disclosure, which has a transmission 2 driven by an electric motor 3. The rotary motion of the transmission 2 is converted by a lead screw 4 into a linear motion, thereby moving a piston 5 axially. The lead screw 4 is made from a metal. At an opposite end from the piston 5, the lead screw 4 is surrounded by a coil 6, which is arranged on a carrier element 7. The coil 6 and the carrier element 7 are surrounded by a metal shield 8. An evaluation circuit 10, which is connected to the coil 6, is positioned on a carrier board 9.

Figure 2:
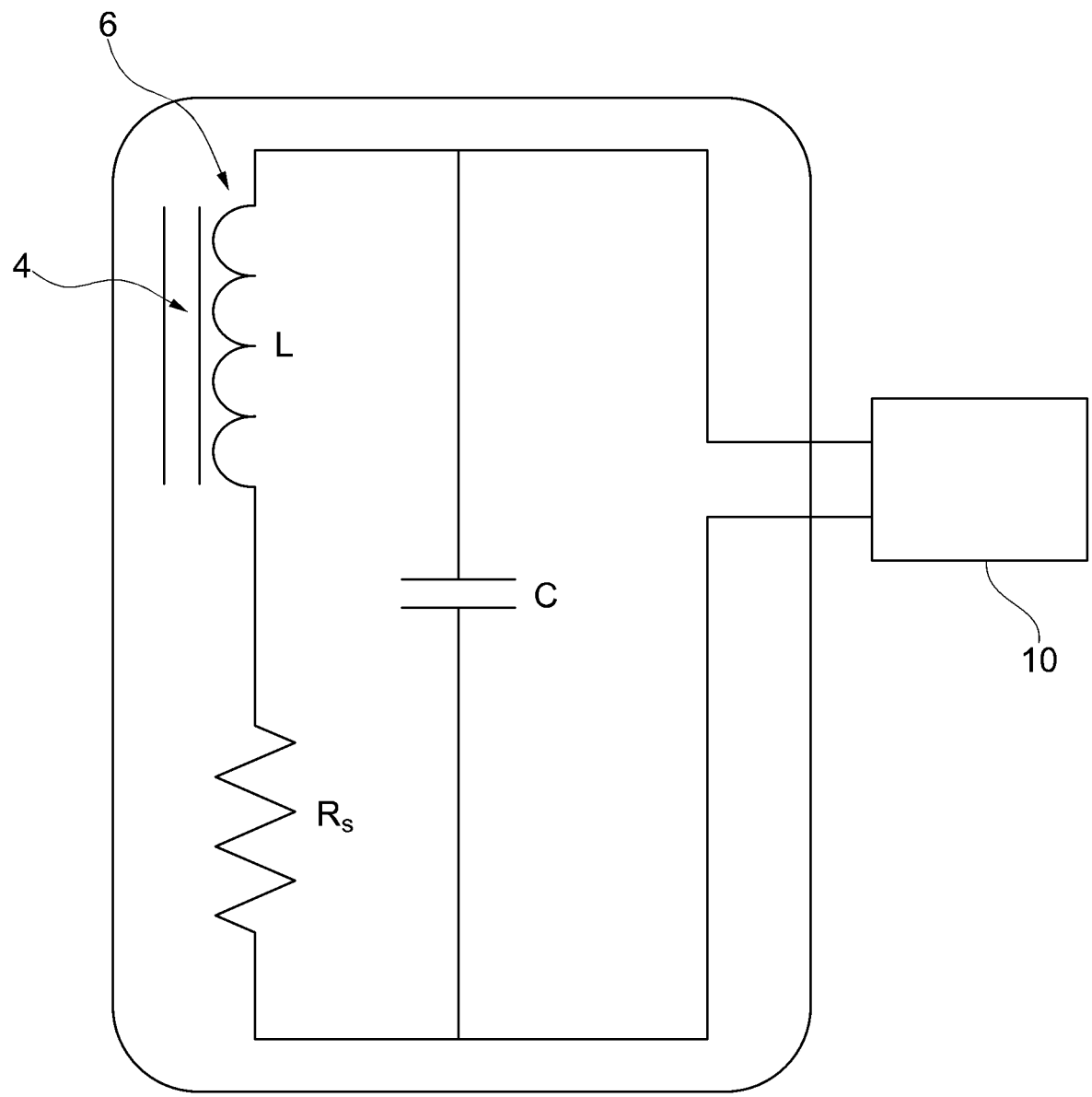
FIG. 2 shows an equivalent circuit diagram for the inductance measurement.
Figure 3:
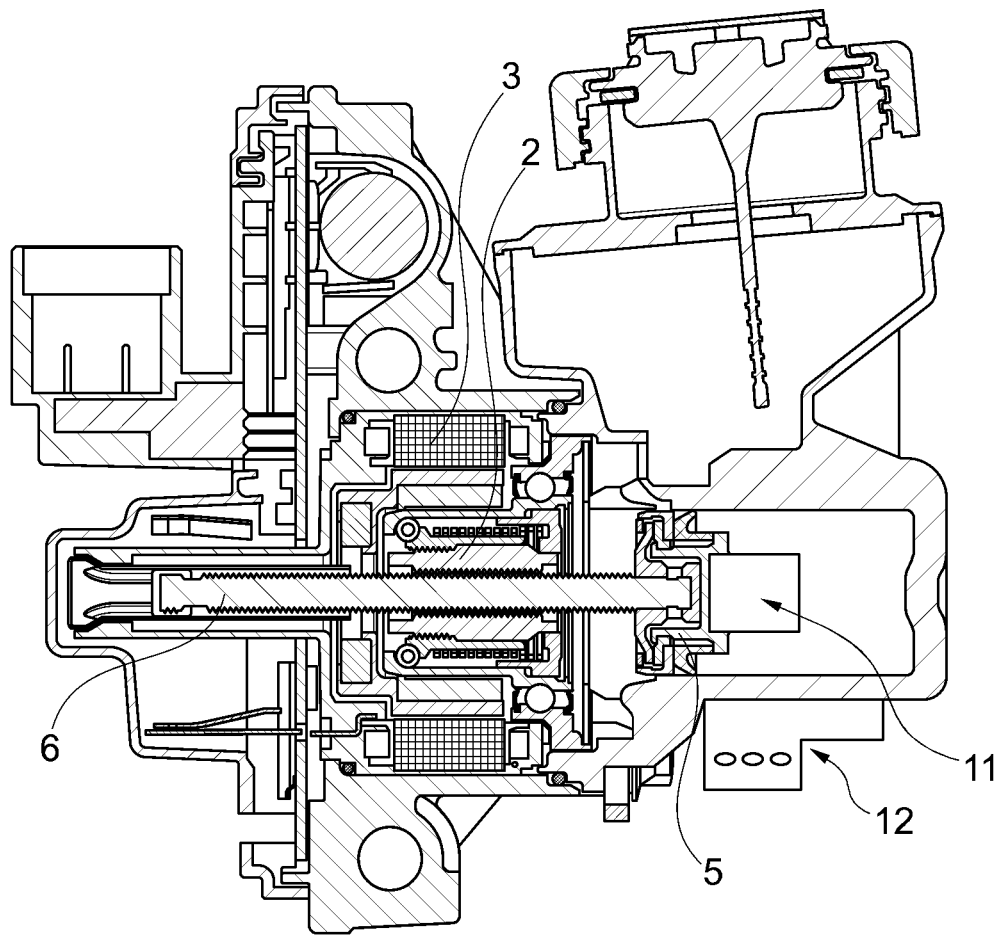
FIG. 3 shows an actuator arrangement according to the prior art.

During the movement of the metal lead screw 3, which acts as a metal core of the coil 6, the inductance of the coil 6 changes. In order then to detect the position of the piston 5 with the aid of the lead screw 3, the lead screw 3 damps the coil 6 as it enters the entry path predetermined by the coil 6. The entry path of the lead screw 4 is thus proportional to the coil damping. This coil damping is measured by means of the evaluation circuit 10 since it results in different inductances of the coil. In this case, the evaluation circuit 10 deduces the position of the lead screw 4 and thus the distance traveled by the piston 5 from the inductance measurement. An equivalent circuit diagram is illustrated in FIG. 2.

In order to compensate for nonlinear inductances, which are caused primarily by static metal components in the immediate zone of influence of the coil 6, the coil 6 is linearized. The metal shield 8 shields the coil 6 from external dynamic influences. Through the adaptation of an excitation frequency of the coil 6 to the immediate surroundings, the static metal tube of the metal shield 8 is thus also blanked out by an offset compensation in the output signal of the evaluation circuit 10.

In one embodiment, a magnetic rotor position sensor (not illustrated specifically) is arranged at an opposite end of the lead screw 4 from the piston. This rotor position sensor is used to detect the axial position of the lead screw 4 when the actuator arrangement is switched on. This is necessary in order to cover a complete path of movement of the lead screw 4, which can amount to several motor revolutions. Over 3600, the position of the lead screw can be determined by the rotor position sensor for motor commutation. Thus, the axial distance which has been determined by inductance measurement can be calibrated by means of the rotation measurement of the rotor position sensor.

REFERENCE NUMERALS 1 actuator arrangement
2 mechanism
3 electric motor
4 lead screw
5 piston
6 coil
7 carrier element
8 metal shield
9 carrier board
10 evaluation electronics
11 magnet
12 displacement sensor

The invention claimed is:

1. A method for operating an actuator arrangement for a clutch operating system comprising:
   providing an actuator arrangement comprising:
      a transmission comprising:
         an electric motor; and
         a metal lead screw that converts a rotary motion into a linear motion;
      a piston connected to the metal lead screw; and
      an inductive sensor device;
   energizing the electric motor to linearly displace the metal lead screw in an axial direction;
   axially displacing the piston with the metal lead screw;
   using the metal lead screw as a target for the inductive sensor device; and
   using the inductive sensor device to determine an axial distance traveled by the piston.

2. The method of claim 1, wherein the inductive sensor device comprises:
   a coil surrounding at least a portion of the metal lead screw; and
   an evaluation circuit.

3. The method of claim 2, wherein an excitation frequency of the coil is tuned with respect to a surrounding zone of influence of the coil within the actuator arrangement.

4. The method of claim 2, wherein the coil is linearized.

5. The method of claim 1 further comprising:
   providing a rotational position sensor; and
   checking plausibility of the axial distance by measuring a rotation of the metal lead screw with the rotational position sensor.

6. An actuator arrangement for a clutch operating system, comprising:
   a transmission comprising a metal lead screw that converts a rotary motion of the transmission into a linear motion;
   a piston connected to the metal lead screw; and
   a sensor device for determining a travel of the piston, comprising:
      a coil that surrounds the metal lead screw such that the metal lead screw is used as a sensor target; and
      an evaluation circuit, connected to the coil, for determining a metal lead screw position from a change in an inductance of the coil.

7. The actuator arrangement of claim 6, wherein the evaluation circuit is arranged within the actuator arrangement.

8. The actuator arrangement of claim 6 further comprising a metal shield arranged around the coil.

9. The actuator arrangement of claim 6, further comprising a coil carrier; wherein:
   the coil is arranged on the coil carrier; and
   an extent of the coil predetermines an entry zone for the metal lead screw.

10. The actuator arrangement of claim 6, further comprising a rotor position sensor for detecting a rotation of the metal lead screw that is arranged opposite one end of the metal lead screw.

* * * * *